United States Patent [19]

Haugen et al.

[11] Patent Number: 5,044,607
[45] Date of Patent: Sep. 3, 1991

[54] TIRE SPREADER

[75] Inventors: Ronald F. Haugen; David T. Murphy, both of Forest City, Iowa

[73] Assignee: Vix Design Products, Inc., Forest City, Iowa

[21] Appl. No.: 454,034

[22] Filed: Dec. 20, 1989

Related U.S. Application Data

[63] Continuation-in-part of Ser. No. 342,446, Apr. 24, 1989.

[51] Int. Cl.$^5$ .............................................. B66F 3/24
[52] U.S. Cl. .................................................. 259/50.3
[58] Field of Search ............... 254/50.3, 50.1, 50.2, 254/50.4, 30, 93 R, 93 H, 133 R; 72/705

[56] References Cited

U.S. PATENT DOCUMENTS

| 1,888,834 | 11/1932 | Puleo | 254/50.3 |
|---|---|---|---|
| 2,073,510 | 3/1937 | Bishman . | |
| 2,223,915 | 12/1940 | Lambert . | |
| 2,310,891 | 2/1943 | Branick . | |
| 2,497,813 | 2/1950 | Darr . | |
| 2,732,174 | 1/1956 | Kossman . | |
| 2,775,290 | 12/1956 | Mondaro . | |
| 2,784,937 | 3/1957 | Lefke | 254/50.3 |
| 2,821,361 | 1/1958 | Marks . | |
| 2,855,180 | 10/1958 | Douglass . | |
| 2,967,044 | 1/1961 | Corcreham et al. | 254/30 |
| 3,834,434 | 9/1974 | Walsh | 254/93 R |
| 3,847,197 | 11/1974 | Konen . | |
| 3,880,220 | 4/1975 | Bunts . | |
| 3,891,187 | 6/1975 | Bearden | 254/93 R |
| 3,942,575 | 3/1976 | Blomgren, Sr. et al. . | |
| 3,946,988 | 3/1976 | Kehren | 254/93 R |
| 4,270,733 | 6/1981 | PePue | 254/93 R |
| 4,443,001 | 4/1984 | Haerer | 254/93 R |
| 4,768,753 | 9/1988 | Gates | 254/93 R |
| 4,787,433 | 11/1988 | Thomas . | |

OTHER PUBLICATIONS

The tire spreaders brochure, "Tire Spreaders", p. 112, Akron, Ohio.

Primary Examiner—Robert C. Watson
Attorney, Agent, or Firm—Burd, Bartz & Gutenkauf

[57] ABSTRACT

An apparatus for spreading the bead of a pneumatic tire from a rim has a double acting piston and cylinder assembly that moves to an extended spread position and a retracted position. The piston and cylinder assembly has a cylinder, a piston slideably disposed in the cylinder and a piston rod connected to the cylinder. A first jaw connected to the piston rod is adapted to engage the rim supporting the tire. A second jaw is secured to the cylinder for engagement with the bead of the tire. A rod and tube guide structure connected to the first jaw in the cylinder maintains the jaws in longitudinal alignment during the extension and contraction of the piston and cylinder assembly. A control valve mounted on the cylinder has a pair of valving members interconnected with a pivoted beam so that the valving members function together to selectively move the jaws to an expanded spreading position and a retracted position.

21 Claims, 5 Drawing Sheets

TIRE SPREADER

This application is a continuation-in-part of U.S. application Ser. No. 342,446 filed Apr. 24, 1989.

FIELD OF INVENTION

The invention relates to spreading devices for pneumatic tires. The devices operate to spread the beads of the tires and hold the tires in spread positions to facilitate inspection and repair of the inside of the tires.

BACKGROUND OF INVENTION

Tubeless pneumatic tires are normally mounted on rims secured to axles of vehicles. When the tires are punctured or cut repairs are required to restore the tires to operating condition. The tires must be spread from the rims to provide access to the interior of the tires so that work persons can inspect and perform necessary repairs. Mechanical devices operated with air cylinders are used to break the beads of tires from rims. An example of a tire bead releaser tool for vehicle tires is disclosed in U.S. Pat. No. 2,775,290 issued to C. C. Mondaro on Dec. 25, 1956. Once the beads are separated from the rims one of the beads must move away from the rims to permit inspection and repair. The beads must be retained in the spread positions for inspection and repair of the tires. Mechanical tire spreaders are used to hold open tire beads to allow inspection and servicing of tires. These spreaders have brackets and arms that are moved apart to spread the beads of vehicle tires. The tire spreader of the invention is an improvement over prior tire spreading devices.

SUMMARY OF INVENTION

The invention relates to an apparatus to spread a pneumatic tire bead away from a rim and hold the tire in a spread position to enable a work person to inspect and repair the inside of the tire. The apparatus is also used to spread opposite beads of a tire. The apparatus has a linear actuator having relatively moveable members supporting jaws that engage the rim and a tire bead to spread one side wall of the tire away from the rim and hold the tire in a spread position. The apparatus is portable and useable for field service tire repairs.

The preferred embodiment of the tire spreader has a piston and cylinder assembly that includes a piston rod slidably mounted in a cylinder. A front jaw is mounted on the piston rod. A rear jaw is mounted on the cylinder. A linear guide structure connected to the front jaw and cylinder maintains the jaws in alignment with each other. An air control valve incorporated into a handle is mounted on the cylinder to control the expansion, holding, and contraction of the piston rod relative to the cylinder. The control valve has a pair of valving members to selectively control flow of air to and from opposite ends of the cylinder and trap air within the cylinder. When the front jaw is in engagement with the rim of the tire the rear jaw engages a bead of the tire. Upon expansion the piston and cylinder assembly the tire is spread and held in a spread position to provided access for servicing and repair of the tire. When the piston and cylinder assembly is retracted the tire spreader can be removed from the tire and rim.

The tire spreader is useable with different size tires and readily handled and operated with a single work person. The tire spreader operates to hold the tire in a spread position so that the work person can inspect and service the inside of the tire. After the tire has been repaired, the tire spreader is contracted and removed from the tire. The tire is then remounted on the rim and inflated with air.

The invention includes a control valve assembly for regulating the flow of fluid, such as air under pressure, to opposite chambers of a double acting piston and cylinder assembly. The control valve has a body with space generally parallel first and second bores. Valve members are moveably located in the bores for selective movement between open and closed positions. Each valve member has a first spool for controlling the flow of fluid to one of the chambers of the piston and cylinder assembly and a second spool for controlling the flow of fluid out of the other chamber of the piston and cylinder assembly when fluid under pressure is supplied to the one of the chambers. Seals located in the bores cooperate with the spools to control the flow of fluid through the bores. The fluid under pressure acting on the valve members operates to automatically return the valve members to their closed positions without external force or springs. The body has a fluid inlet port open to the first bore adapted to be connected to a supply of fluid under pressure. A passage in the body connects the first bore with the second bore to allow fluid under pressure to flow from the first bore to the second bore. A first fluid outlet port open to the first bore is adapted to be connected with a tube or like means that carries the fluid under pressure to and from one chamber of the piston and cylinder assembly. A second fluid outlet port in the body open to the second bore is adapted to be connected to a tube having a passage for carrying fluid under pressure to and from the other chamber of the piston and cylinder assembly.

DESCRIPTION OF PREFERRED EMBODIMENT

Figure 1:
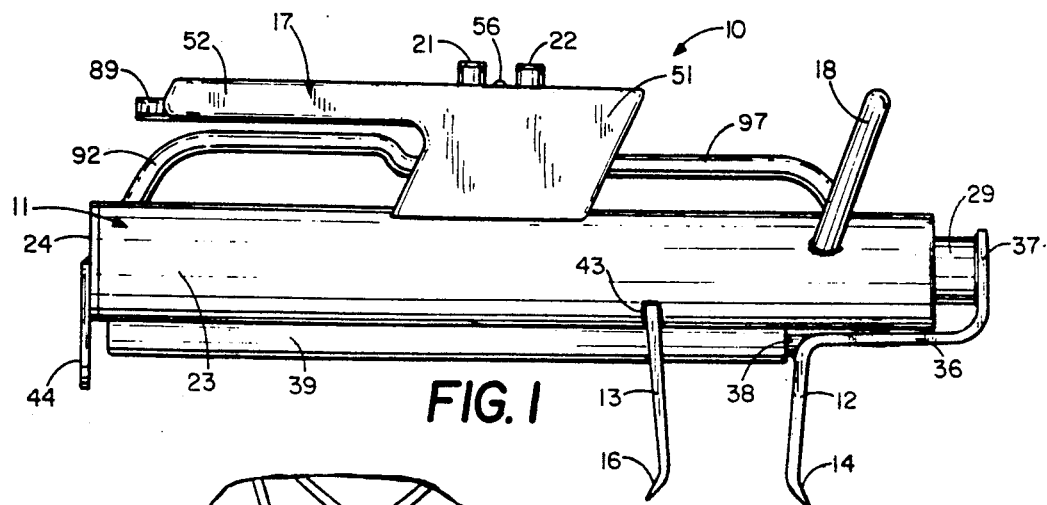
FIG. 1 is a side elevational view of the tire spreader of the invention in the retracted position.
Figure 2:
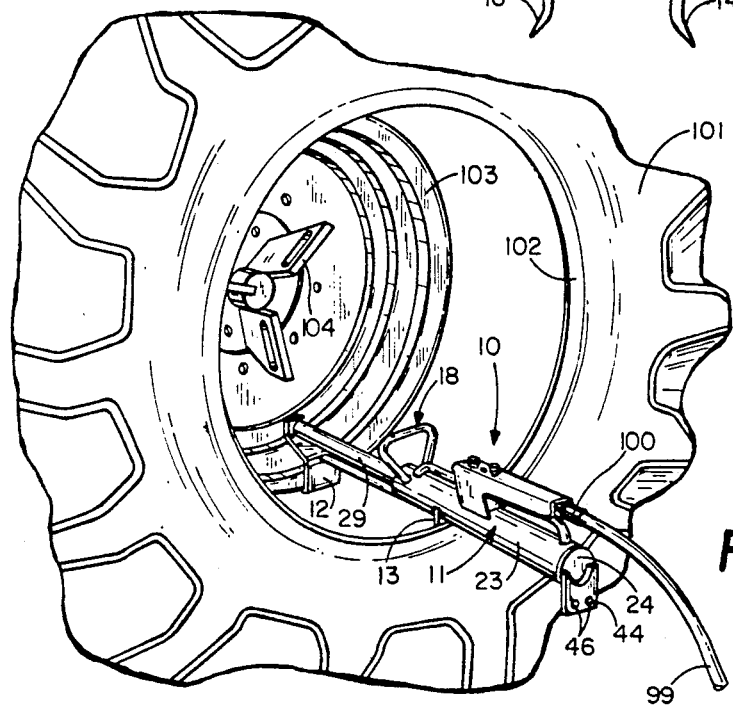
FIG. 2 is a perspective view of a vehicle tire spread apart with the tire spreader of FIG. 1.

Referring to the drawing there is shown in FIGS. 1 and 2 the tire spreader of the invention indicated generally at 10 for spreading a bead 102 of a tire 101 away from a rim 103 and hold bead 102 in a spread position. Spreader 10 is also useable to separate the beads and side walls of a conventional pneumatic tire for inspection and repair by a work person. Tire spreader 10 has a linear extendible and contractible apparatus, shown as a piston and cylinder assembly 11. Piston 29 is an elongated cylindrical member having a forward end that is attached to a front jaw 12. A rear jaw 13 in general longitudinal alignment with front jaw 12 is attached to cylinder 23. Front jaw 12 has a downwardly and forwardly directed lip 14. Rear jaw 13 has a downwardly and rearwardly directed lip 16 in general horizontal alignment with lip 14. A generally horizontal hand grip 17 is secured to the mid portion of the top of cylinder 23. An inverted U-shaped handle 18 is secured to the top of the forward end of cylinder 23 to facilitate manual handling of tire spreader 10. Grip 17 surrounds an air control valve 19, shown in FIG. 7, that is operable to selectively supply and axhaust air under pressure from opposite ends of cylinder 23. Valve 19 has a pair of actuators 21 and 22 that are manually operable to control the flow of air to and from the opposite ends of cylinder 23, as hereinafter described.

Figure 7:
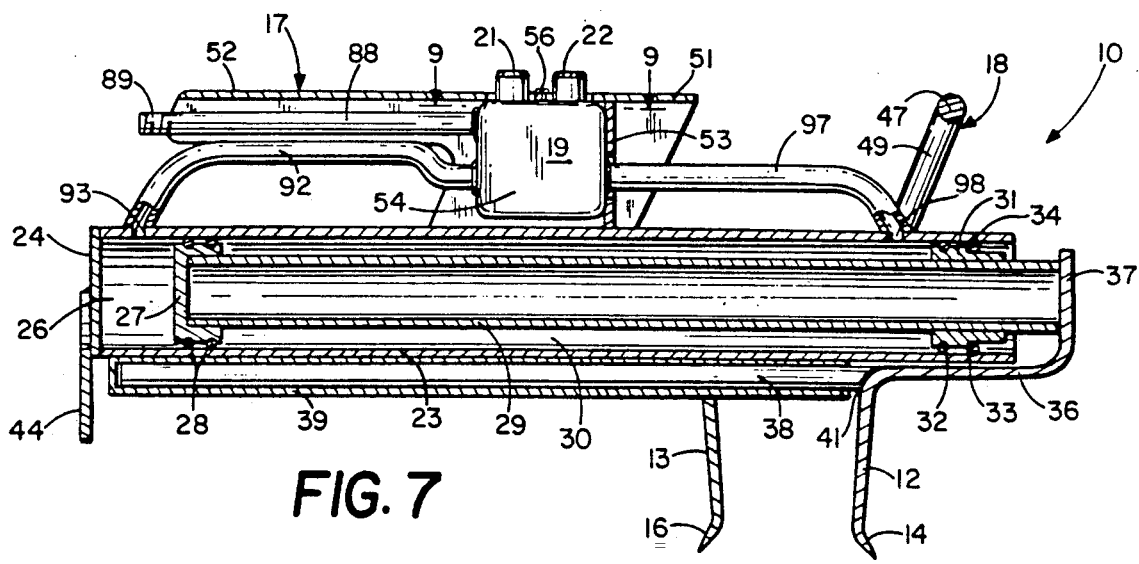
FIG. 7 is a sectional view taken along line 7—7 of FIG. 6.
Figure 9:
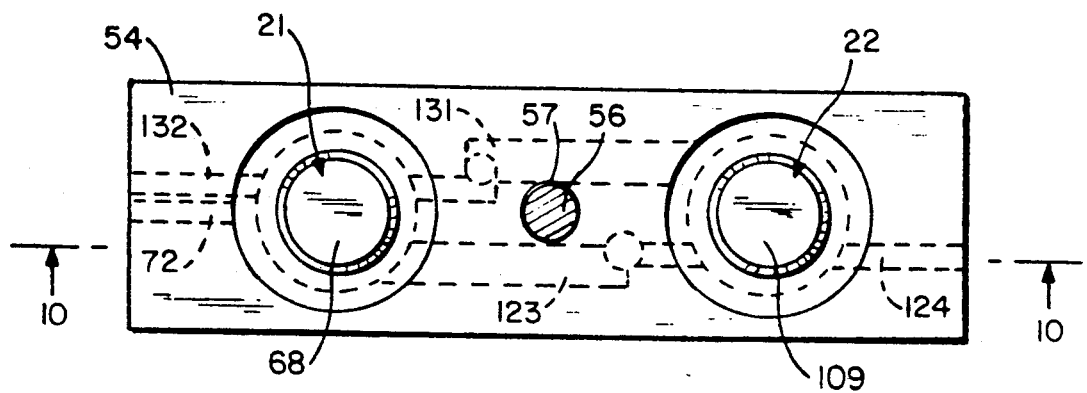
FIG. 9 is an enlarged sectional taken along line 9—9 of FIG. 8 showing the air control valve in the hold position.

As shown in FIG. 7, cylinder 23 has a closed end 24 closing a first chamber 26. A generally cup shaped piston 27 carrying annular seals 28 is slideably located within cylinder 23. An elongated tubular piston rod 29 attached to piston 27 extends through a sleeve or collar 31 at the rod end of cylinder 23. An annular seal 32 is interpossed between collar 31 and the inner surface of cylinder 23 to enclose a second chamber 30 whereby piston and cylinder assembly 11 has a double acting function. Collar 31 is retained in assembled relation with cylinder 23 with a snap ring 33 positioned in an annular groove 34 in the inner surface of cylinder 23.

Figure 8:
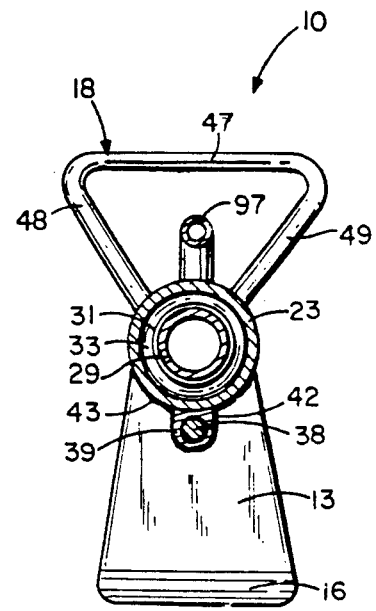
FIG. 8 is an enlarged sectional view taken along line 8—8 of FIG. 7.

Front jaw 12 has a rearwardly directed neck 36 attached to the downwardly directed jaw portion that terminates in lip 14. An upwardly directed ear 37 attached to neck 36 is secured to the forward or outer end of piston rod 29 so that front jaw 12 moves with piston rod 29 relative to cylinder 23. The linear longitudinal movement of jaw 12 is maintained with a linear guide rod 38 secured to the rear portion of neck 36. Guide rod 38 is slideably located in a linear tube 39 secured by welds or the like to a bottom linear portion of cylinder 23. Tube 39, as seen in FIG. 8, projects through a opening 42 in the upper end of rear jaw 13. Rod 38 and tube 39 comprise a guide assembly for jaw 12 that prevents rotation of jaw 12 relative to jaw 13 during relative movement of the jaws 12 and 13.

Rear jaw 13 has a generally U-shaped upper end 43 welded to a circumferential portion of cylinder 23 thereby fixing rear jaw 13 to cylinder 23. Jaw 13 has opposite side edges that diverge outwardly and downwardly toward lip 16. Jaw 13 projects downwardly and has a length that is substantially the same as the length of jaw 12.

Figure 5:
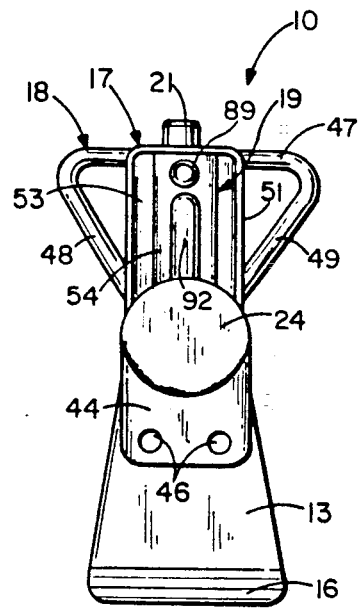
FIG. 5 is a rear elevational view of the tire spreader of FIG. 1.

As seen in FIGS. 5 and 7, a downwardly directed bracket 44 having a pair of holes 46 is secured to end plate 24. The holes are adapted to receive fasteners that attach an auxiliary jaw (not shown) to cylinder 23. In large tires the auxiliary jaw is used to increase the spread distance of the tire bead relative to the rim.

Figure 3:
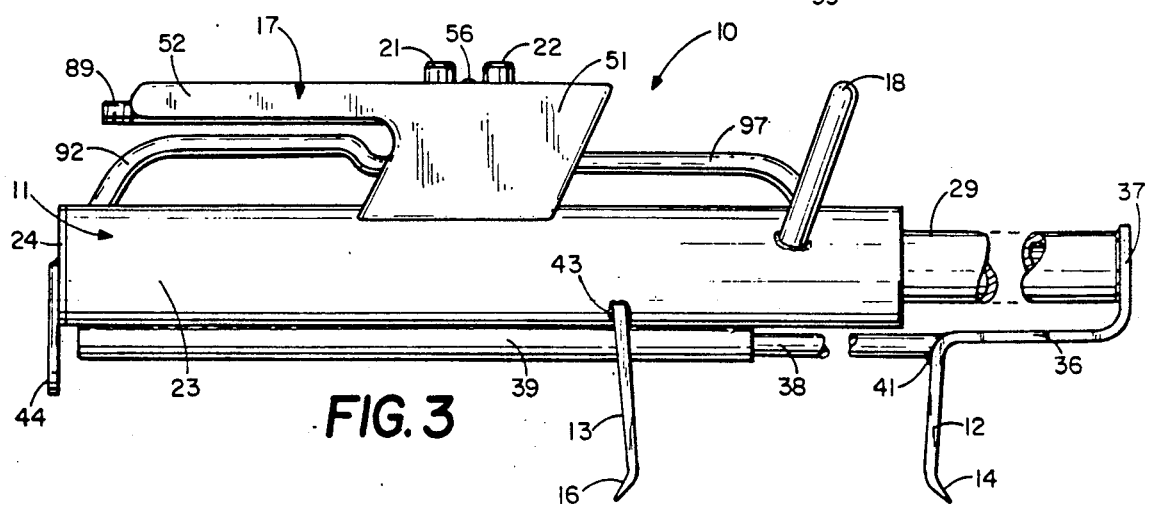
FIG. 3 is a foreshortened side elevational view of the tire spreader of FIG. 1 in the expanded position.
Figure 4:
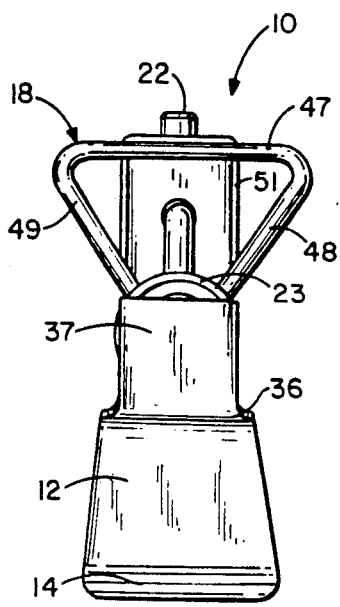
FIG. 4 is a front elevational view of the tire spreader of FIG. 1.
Figure 6:
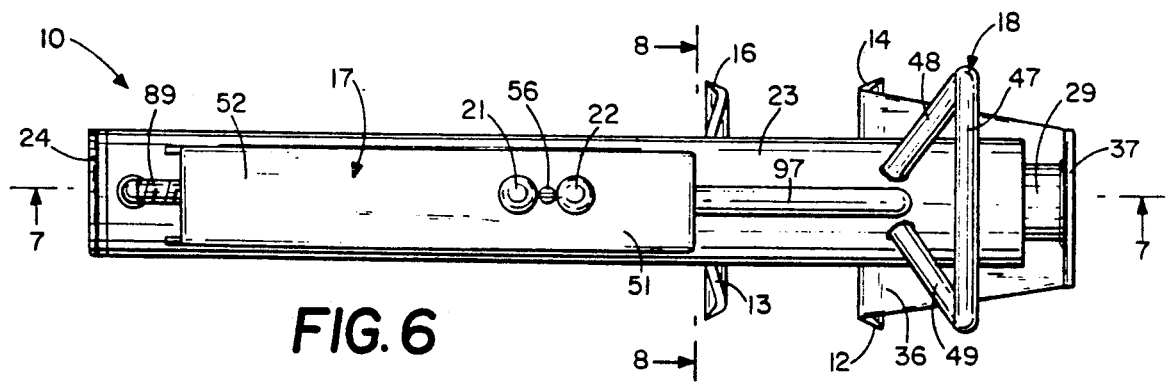
FIG. 6 is a top plan view of the tire spreader of FIG. 1.

Referring to FIGS. 3, 6, and 7, handle 18 has a transverse generally horizontal hand grip 47 located adjacent the forward end of cylinder 23. A pair of downwardly and rearwardly directed legs 48 and 49 attached to opposite ends of hand grip 47 are secured to the cylinder 23 as seen in FIG. 6.

Handle 17 has an inverted U-shape body 51 that extends over an air control valve 19. The lower portions of body 51 are located in close relationship to the outer cylindrical surface of cylinder 23 to protect the sides of control valve 19. A rearwardly direct second hand grip 52 is joined to body 51 to permit tire spreader 10 to be handled with both hands of the work person. Hand grip 47 is oriented perpendicular to hand grip 52. Grip 47 is transverse to the longitudinal axis of cylinder 23. Grip 52 is parallel to the longitudinal axis of cylinder 23.

Figure 12:
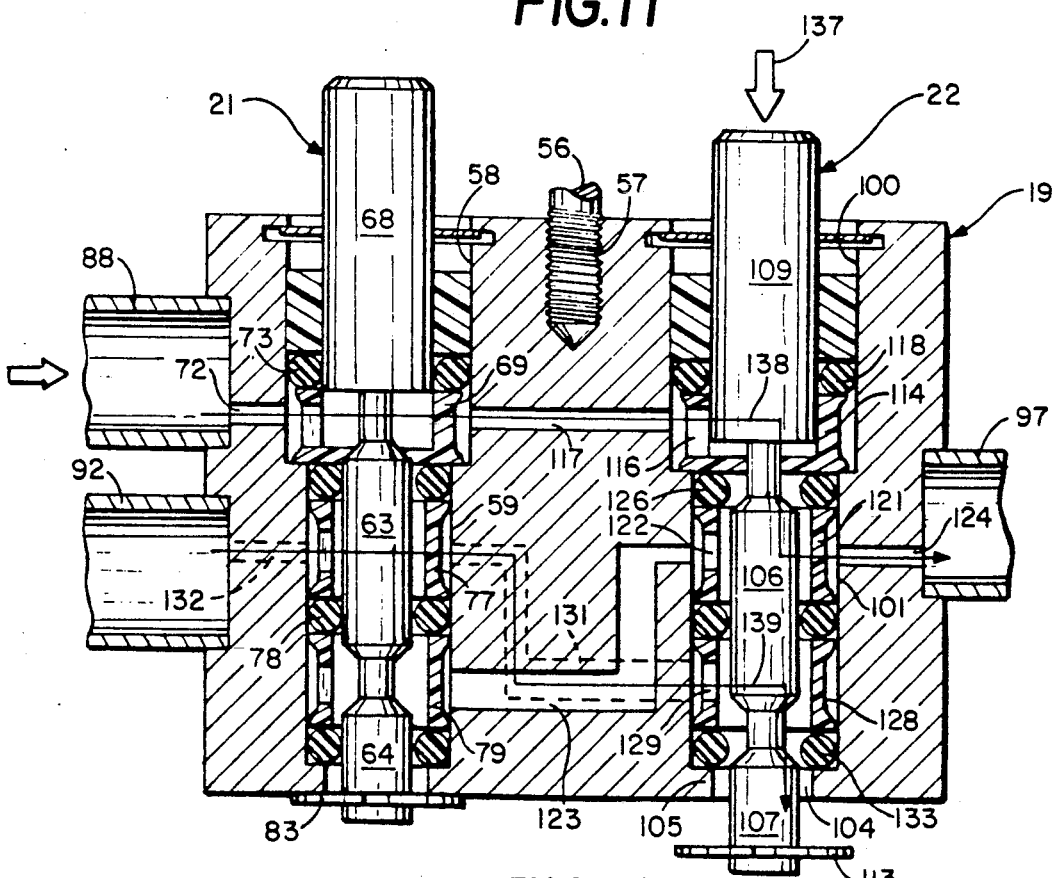
FIG. 12 is a sectional view similar to FIG. 10 showing the air control valve in the jaw contract position.
Figure 13:
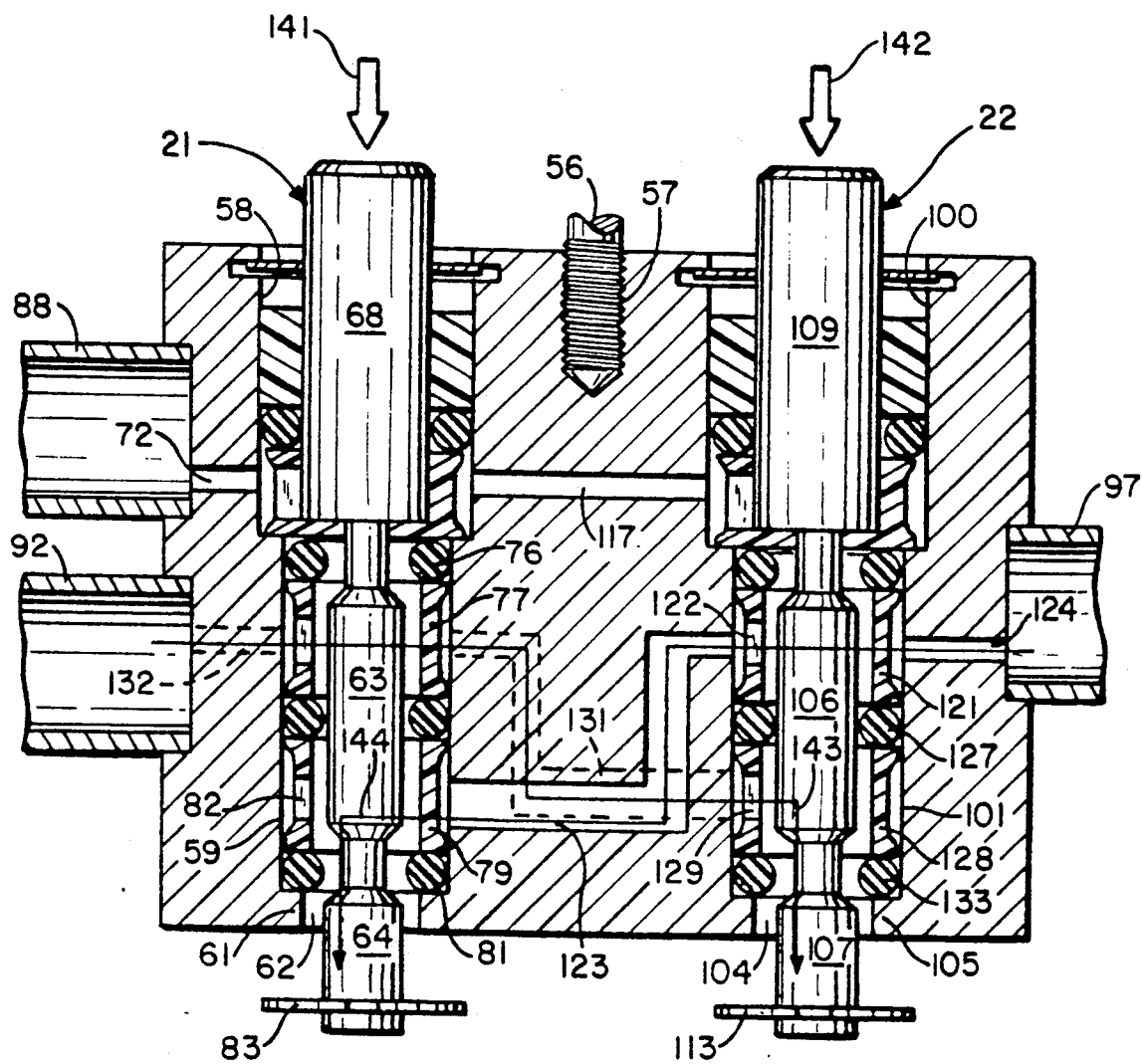
FIG. 13 is a sectional view similar to FIG. 10 showing the air control valve in the valve storage position.

As shown in FIG. 7, an upwardly directed mounting bracket 53 is located within U-shape body 51 and secured thereto by welds or the like. Control valve 19 has a body or housing 54 that is attached to body 51 with a fastener such as a bolt 56. Bolt 56 is threaded into a threaded hole 57 in the body 51, as shown in FIGS. 10, 12 and 13.

Figure 10:
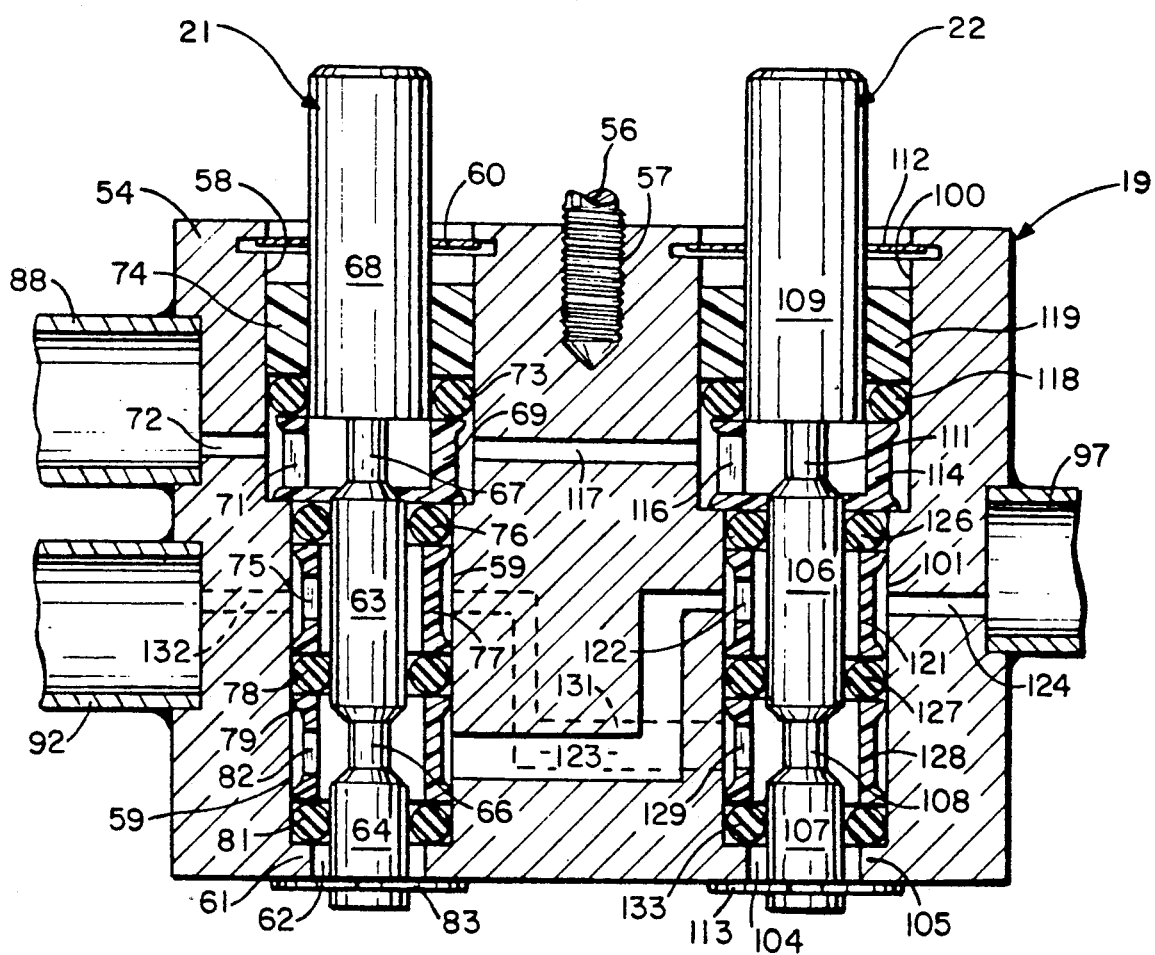
FIG. 10 is a sectional view taken along line 10—10 of FIG. 9.

As shown in FIG. 10, body 54 has a first upright bore 58 having a lower reduced diameter portion 59 extended to an inwardly directed annular shoulder 61 surrounding a lower open end 62. First bore 58 accommodates a first generally upright spool 63 and a second spool 64. A neck 66 connects spools 63 and 64. A second neck 67 secured to the upper end of spool 63 is attached to a cylindrical actuator body or member 68. A metal sleeve or channel bushing 69 located in bore 58 surrounds neck 67. Sleeve 69 has a side port 71 in alignment with a passage 72 in body 54 in communication with air supply pipe 88. An O-ring 73 located above sleeve 69 engages a cylinderical bearing 74 located in bore 58. Cylindrical actuator member 68 linearly slides on the inner surface of bearing 74 as it moves between its open and closed positions. A retaining ring 60 surrounding actuator member 68 holds bearing 74 in bore 58. A second O-ring located below sleeve 69 surrounds the spool 63. Another O-ring 78 surrounds the lower end of spool 63. A second metal sleeve or channel bushing 77 having a side port 75 is located between O-rings 76 and 78. Opening 75 is in alignment with a passage 132 leading to pipe 92.

A third metal sleeve or channel bushing 79 surrounds neck 66 and engages an O-ring 81 surrounding spool 64. Sleeve 79 has a side port 82 allowing air to flow from the inside of sleeve 79 and around sleeve 79 to a passage 106. A C-clip or retainer 83 is secured to the bottom of spool 64 to limit upward movement of actuator 21 caused by air under pressure acting on member 68.

Housing 54 has a second generally upright bore 101 having a lower reduced diameter bore portion 102. An inwardly directed shoulder 103 at the bottom of bore 101 surrounds a bottom opening 104. A generally upright upper spool 106 and a lower spool 107 are located in bore portion 102. The lower spool 107 projects through lower opening 104 in communication with atmosphere. A reduced diameter neck 108 connects spools 106 and 107. A cylindrical actuator body 109 is located in bore 101 above spool 106. A reduced diameter neck 111 connects spool 106 with the bottom or actuator body 109. An upper retaining ring 112 mounted on housing 54 surrounds actuator body 109. A lower retaining ring 113 mounted on spool 107 limits upward movement of actuator 22 relative to housing 54 cause by air under pressure acting on body 109. A first metal sleeve or channel bearing 114 located in bore 101 surrounds neck 111. Sleeve 114 has a side port 116 open to bore 101 and a transverse passage 117 leading to bore 58. An O-ring 118 is located above sleeve 114 and below a bearing 119 located in bore 101. Body 109 slides on bearing 119 during movement of actuator 22 between its open and closed positions.

A second metal sleeve or channel bearing 121 having a side port 122 aligned with a passage 123 leading to the lower portion of bore portion 59 is located in bore portion 102. A second passage 124 is open to pipe 97 and the bore portion 102 adjacent sleeve 121. An O-ring 126 surrounding spool 106 engages the bottom of sleeve 114. A second O-ring 127 around spool 106 engages the bottom of sleeve 121. A third sleeve or channel bearing 128 having a side port 129 aligned with a passage 131 in housing 154 is located about neck 108. Passage 131 is open to bore portion 59 adjacent sleeve 77. A second passage 132 in housing 54 connects bore section 59 with pipe 92 allowing air to evacuate from pipe 92 to atmosphere when actuator 22 has been moved to the in or open position. An O-ring 133 is interposed between the bottom of sleeve 128 and shoulder 103. O-ring 133 surrounds and is located in sealing engagement with the lower spool 107.

FIG. 10 shows the valve in the hold position. The valve actuators 21 and 22 are in the up or closed positions wherein spools 63, 64, 106 and 107 are in sealing engagement with their associated O-rings thereby preventing air from being introduced to the cylinder and evacuated from the cylinder. The pressure of the air within sleeves 69 and 114 acting on bodies 68 and 109 force actuators 21 and 22 to the closed positions.

Figure 11:
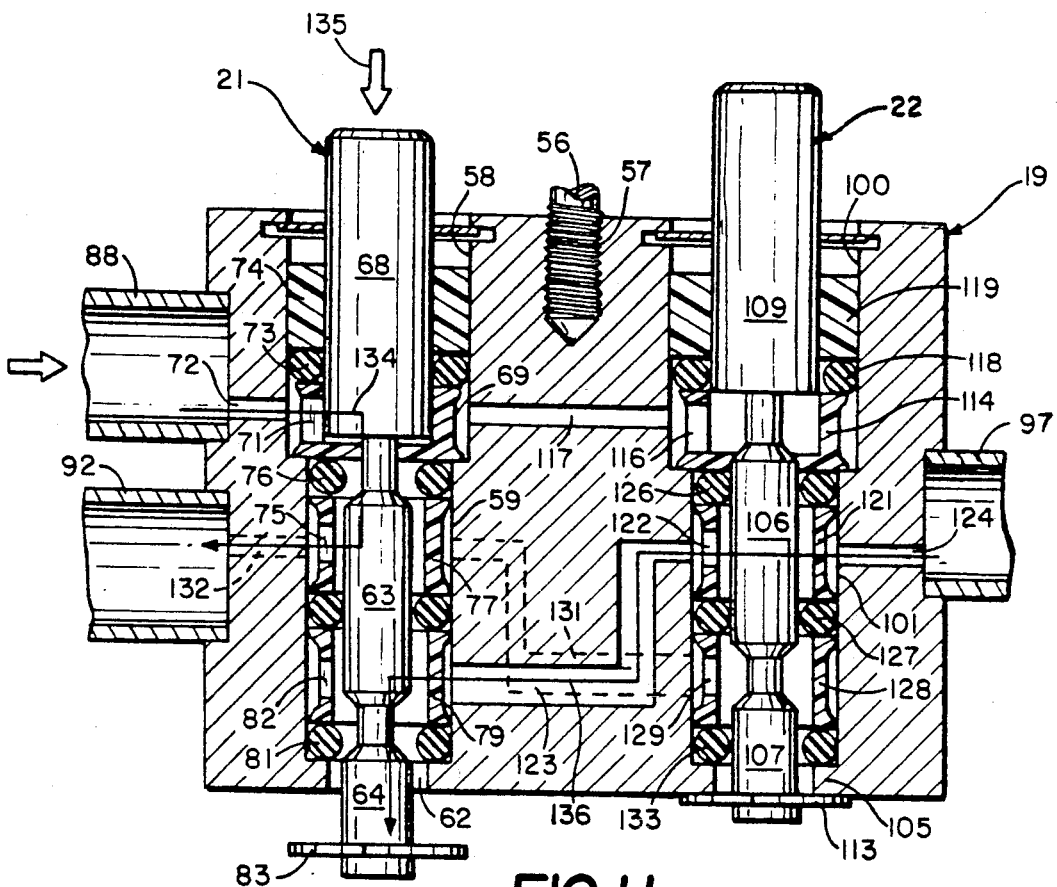
FIG. 11 is a sectional view similar to FIG. 10 showing the air control valve in the jaw spread position.

Referring to FIG. 11, valve assembly 19 is shown in the position wherein actuator 21 allows air under pressure to chamber 26 to extend spreader 10 and allows air to exhaust from chamber 30. The air under pressure from inlet pipe 88 flows through passage 72, port 71 through O-ring 76 and out through port 71 through passage 132 to pipe 92 leading to chamber 26. The flow of air is indicated by arrow 134. Air is exhausted from the opposite end of the cylinder via pipe 97, passage 124, around sleeve 121 and through passage 123 through port 82 and O-ring 81 and bottom openings 62 to atmosphere. The flow of exhaust air has shown by the broken line arrow 136.

Referring to FIG. 12, actuator 22 has been moved to the down or open position as indicated by arrow 137 to supply air under pressure to pipe 97 to retract piston 29 into cylinder 39 as shown in FIG. 7. Air is evacuated from chamber 26 via pipe 92. The air under pressure from pipe 88 flows through passage 92 around sleeve 69 through passage 117 into bore 101 surrounding sleeve 114. The air flows through O-ring 126, port 122, around sleeve 127, and through passage 124 into pipe 97 leading to chamber 30 as seen in FIG. 7. The flow path of the air is indicated by arrow 138. Exhaust air from pipe 92 flows through passage 132 around sleeve 77, through passage 131 and port 129, O-ring 133 and opening 104 to atmosphere. The flow path of the exhaust air is shown by the broken line arrow 139.

Referring to FIG. 13, there is shown valve assembly 19 in the storage or total exhaust position. Both valve actuators 21 and 22 have been moved to the down or open positions as indicated by the arrows 141 and 142. Valve actuator 21 allows the air from the chamber 30 of the piston and cylinder assembly to evacuate to atmosphere. Valve actuator 22 functions to allow air from the chamber 26 of the piston and cylinder assembly to evacuate to atmosphere. Thus, the piston and cylinder assembly 11 is relieved of air pressure during storage.

The air in pipe 92 flows passage 132, around sleeve 77, through passage 131, through port 129 into sleeve 128, downwardly through O-ring 133 and outlet passage 104 to atmosphere. The air in pipe 97 flows through passage 124 around sleeve 121, through passage 123 and into sleeve 79 via port 82, down through O-ring 82 and outlet openings 62 to atmosphere. The flow path of the air is shown by the broken line arrow 144.

In use as shown in FIG. 2, tire spreader 10 is used to spread one of the beads 102 of the pneumatic tire from rim 103 after it has been separated from the rim. Rim 103 is secured to a support or holder 104 which retains the rim in its upright position. Front jaw 12 is placed in engagement with the lower edge of rim 103. Rear jaw 13 is placed inside tire bead 102. The operator utilizes hand grips 17 and 18 to manually place tire spreader 10 in its operative position relative to rim 103 and tire bead 102. Valve assembly 19 is connected to a source of air under pressure. Actuator 21 is operated to spread bead 102 from rim 103 by allowing air to expand the piston and cylinder assembly 11. When actuator 21 is released air is locked within piston and cylinder assembly 11 to hold the jaws in the open or expanded positions. The work person having acess to the interior of the tire can preform inspection and repair. The spreader 10 is removed from the tire and rim by moving actuator 22 to the in or open position whereby the air contracts te piston and cylinder assembly 11.

Spreader 10 can also be used to spread or separate opposite beads and side walls of a pneumatic tire. The jaws 12 and 13 are located in engagement with inside portions of the opposite beads. Expansion of the piston and cylinder assembly 11 spreads the beads to allow inspection and repair by the work person. The spreader 10 is removed from the tire by contracting the piston and cylinder assembly 11.

While there has been shown and described a preferred embodiment of the tire spreader of the invention is understood that changes in the structure, arrangement of structure and parts may be made by those skilled in the art without departing from the invention. The invention is defined in the following claims.

We claim:

1. An apparatus for spreading a bead of a pneumatic tire away from a rim accommodating the tire and holding the tire in a spread position comprising: extendible and contractible means having a first piston member and a second cylinder member having an outer side wall and a chamber accommodating the piston member, said first and second members being movable relative to each other to an extended position and a contracted position, a first jaw connected to the first member adapted to engage the rim, a second jaw connected to the second member adapted to engage the bead and move the bead away from the rim thereby spread the tire when the first and second members are in the extended position, guide means connected to the first jaw and second member for keeping the first jaw longitudinally aligned with the second jaw during relative movement of said jaws between the extended and contracted positions thereof, said guide means comprising an elongated tubular member having a guide passage secured to the outer side wall of the second cylinder member, said guide passage extending generally parallel to the direction of relative movement of the first and second members, and rod means secured to the first jaw slideably extended into the passage of the tubular member whereby the tubular member and rod means prevent rotational movement of the first jaw relative to the second jaw to keep the jaws longitudinally aligned during relative movement thereof; and means connected to the cylinder member for controlling the flow of fluid under pressure to and from the chamber on opposite sides of the piston member operable to cause selected movement of the first and second members relative to each other thereby move the first and second jaws relative to each other to spread the bead to the tire, hold the first and second jaws in the extended position, and release the spread tire so that the apparatus can be removed from the tire.

2. An apparatus for spreading a bead of a pneumatic tire away from a rim accommodating the tire and holding the tire in a spread position comprising: extendible and contractible means having a first member and a second member, said first and second members being movable relative to each other to an extended position and a contracted position, a first jaw connected to the first member adapted to engage the rim, a second jaw connected to the second member adapted to engage the bead and move the bead away from the rim thereby spread the tire when the first and second members are in the extended position, guide means connected to the first jaw and second member for keeping the first jaw longitudinally aligned with the second jaw during relative movement of said jaws between the extended and contracted positions thereof, means connected to the extendible and contractible means for controlling the operation thereof to cause selected movement of the first and second members relative to each other thereby move the first and second jaws relative to each other to spread the bead of the tire, hold the first and second jaws in the extended position, and release the spread tire so that the apparatus can be removed from the tire, a first handle secured to the second member, said first handle having a transverse hand grip, and a second handle secured to the second member, said second handle being spaced from the first handle and having a longitudinal hand grip.

3. The apparatus of claim 2 wherein: the second handle has an inverted U-shaped body secured to the second member and located over the means for controlling fluid under pressure.

4. The apparatus of claim 2 wherein: the guide means comprises an elongated tubular member having a guide passage secured to the second member, said guide passage extending generally parallel to the direction of relative movement of the first and second members, and rod means secured to the first jaw extended into the passage of the tubular member whereby the tubular member and rod means prevent rotational movement of the first jaw relative to the second jaw to keep the jaws longitudinally aligned during relative movement thereof.

5. The apparatus of claim 2 wherein: the first jaw has a neck extended generally parallel to the direction of movement of the first and second members, and an ear secured to the neck and first member, and a jaw member secured to the neck extended laterally away from the second member.

6. The apparatus of claim 5 wherein: said jaw member has a lower transverse lip, said lip being inclined in a forward and outward direction.

7. The apparatus of claim 2 wherein: the extendible and contractible means comprises a cylinder having a linear chamber, a piston located in said chamber separating the chamber into a first chamber and a second chamber, and a piston rod connected to the piston extended through said second chamber, said first jaw being secured to the piston rod, and said second jaw being secured to the cylinder.

8. The apparatus of claim 7 wherein: the first jaw has a neck extended generally parallel to the piston rod, an ear joined to the neck secured to the piston rod, and a jaw member secured to the neck extended laterally away from the cylinder.

9. The apparatus of claim 7 wherein: the guide means comprises an elongated tubular member having a guide passage secured to the cylinder, said guide passage being generally parallel to the chamber of the cylinder, and a rod secured to the first jaw extended into the passage of the tubular member whereby the tubular member and rod prevent rotational movement of the first jaw relative to the cylinder and second jaw to keep the jaws longitudinally aligned during relative movement thereof.

10. An apparatus for spreading a bead of a pneumatic tire away from a rim accommodating the tire and holding the tire in a spread position comprising: extendible and contractible means having a first member and a second member, said first and second members being movable relative to each other to an extended position and a contracted position, a first jaw connected to the first member adapted to engage the rim, a second jaw connected to the second member adapted to engage the bead and move the bead away from the rim thereby spread the tire when the first and second members are in the extended position, guide means connected to the first jaw and second member for keeping the first jaw longitudinally aligned with the second jaw during relative movement of said jaws between the extended and contracted positions thereof, means connected to the extendible and contractible means for controlling fluid under pressure operable to cause selected movement of the first and second members relative to each other thereby move the first and second jaws relative to each other to spread the bead of the tire, hold the first and second jaws in the extended position, and release the spread tire so that the apparatus can be removed from the tire, the extendible and contractible means comprises a cylinder having a linear chamber, a piston located in said chamber separating the chamber into a first chamber and a second chamber, a piston rod connected to the piston extended through said second chamber, a piston rod connected to the piston extended through said second chamber, said first jaw being secure to the piston rod, and said second jaw being secured to the cylinder, the means for controlling fluid under pressure comprises a valve means having a body attached to the cylinder, said body having first and second bores, a first valve member located in the first bore, a second valve member located in the second bore, said first and second valve members being selectively movable to open and closed position, an air inlet port in the body open to the first bore, a passage in the body connecting the first and second bores to supply air under pressure to the second bore, a first air outlet port in the body open to the first bore, means having a passage connecting the first air outlet port to the first chamber, a second air outlet port in the body open to the second bore, means having a passage connecting the second air outlet port to the second chamber, and means operatively associated with the first and second valve members for controlling the positions of the first and second valve members relative to each other in response to movement of one valve member to the open position whereby air under pressure is selectively supplied to the first chamber and exhausted from the second chamber to move the piston rod out of the cylinder whereby the first and second jaws are moved to an extended position, and supplied to the second chamber and exhausted from the first chamber to move the piston rod into the cylinder whereby the first and second jaws are moved to a contracted position.

11. The apparatus of claim 10 wherein: each valve member has a first spool for controlling the flow of fluid to one of the chambers of the cylinder, and a second spool for controlling the flow of fluid out of the other chamber of the cylinder, when fluid is supplied to said one of the chambers of the cylinder, and seal means located in said bores cooperating with the first and second spools to control the flow of fluid through said bores.

12. An apparatus for spreading a bead of a pneumatic tire away from a rim accommodating the tire and holding the tire in a spread position comprising: extendible and contractible means having a first member and a second member, said first and second members being movable relative to each other to an extended position and a contracted position, a first jaw connected to the first member adapted to engage the rim, a second jaw connected to the second member adapted to engage the bead and move the bead away from the rim thereby spread the tire when the first and second members are in the extended position, guide means connected to the first jaw and second member for keeping the first jaw longitudinally aligned with the second jaw during relative movement of said jaws between the extended and contracted positions thereof, means connected to the extendible and contractible means for controlling fluid under pressure operable to cause selected movement of the first and second members relative to each other thereby move the first and second jaws relative to each other to spread the bead of the tire, hold the first and second jaws in the extended position, and release the spread tire so that the apparatus can be removed from the tire, the extendible and contractible means comprises a cylinder having a linear chamber, a piston located in said chamber separating the chamber into a first chamber and a second chamber, a piston rod connected to the piston extended through said second chamber, said first jaw being secured to the piston rod, and said second jaw being secured to the cylinder, a first handle secured to the cylinder, said handle having a transverse first hand grip and extended away from the cylinder in a direction opposite the outward extension of the jaws, and a second handle secured to the cylinder, said second handle being spaced rearwardly of the first handle having a second hand grip spaced from the cylinder and extended in the longitudinal direction of the cylinder.

13. The apparatus of claim 12 wherein: the second handle has an inverted U-shaped body secured to the cylinder and located over the means for controlling fluid under pressure.

14. An apparatus for spreading a bead of a pneumatic tire away from a rim accommodating the tire and holding the tire in a spread position comprising: a piston and cylinder assembly having a cylinder and a piston means operatively associated with the cylinder whereby the piston and cylinder assembly moves between a retracted position and an extended position in response to fluid under pressure supplied to the cylinder, a first jaw connected to the piston means adapted to engage the rim, a second jaw connected to the cylinder adapted to engage the bead and move the bead away from the rim thereby spread the tire when the piston and cylinder assembly is in the extended position, and valve means connected to the cylinder for controlling fluid under pressure operable to cause selective relative movement of the piston means and cylinder between the retracted and extended positions thereby move the first and second jaws relative to each other to spread the bead of the tire, hold the first and second jaws in the extended position, and release the spread tire so that the apparatus can be removed from the tire, said valve means having a body containing first and second bores, a first valve member located in the first bore, a second valve member located in the second bore, said first and second valve members being selectively moveable to open and closed positions, an air inlet port in the body open to the first bore adapted to be connected to a source of pneumatic fluid under pressure, a passage in the body connecting the first and second bores to allow pneumatic fluid under pressure to flow to the second bore, a first pneumatic fluid outlet port in the body open to the first bore, means having a passage connecting the first pneumatic fluid outlet port to the first chamber, a second pneumatic fluid outlet port in the body open to the second bore, means having a passage connecting the second pneumatic fluid outlet port to the second chamber whereby when the second valving member is moved to the open position a pneumatic fluid under pressure flows to the second chamber, means located within said first and second bores associated with the first and second valve members for controlling the flow of fluid under pressure to the cylinder and the flow of exhaust fluid from the cylinder whereby fluid under pressure is selectively supplied to the first chamber and fluid is exhausted from the second chamber to move the piston means out of the cylinder to locate the first and second jaws in the extended position, and fluid under pressure is supplied to the second chamber and fluid is exhausted from the first chamber to move the piston means into the cylinder whereby the first and second jaws are moved to the retracted position.

15. The apparatus of claim 14 wherein: each valve member has a first spool for controlling the flow of fluid to the piston and cylinder assembly, and a second spool for controlling the flow of fluid out of the piston and cylinder assembly when fluid is supplied to the piston and cylinder assembly, and seal means located in said bores cooperating with the first and second spools to control the flow of fluid through said bores.

16. The apparatus of claim 14 including: a first handle secured to the cylinder, said handle having a transverse first hand grip and extended away from the cylinder in a direction opposite the outward extension of the jaws, a second handle secured to the cylinder, said second handle being spaced rearwardly of the first handle and having a second hand grip spaced from the cylinder and extended in the longitudinal direction of the cylinder.

17. The apparatus of claim 16 wherein: the handle has an inverted U-shaped body secured to the cylinder located over the valve means.

18. The apparatus of claim 14 wherein: the first jaw has a neck extended generally parallel to the cylinder, and ear secured to the neck and the piston means, and a jaw member secured to the neck extended laterally away from the cylinder.

19. The apparatus of claim 18 wherein: said jaw member has a lower transverse lip, said lip being inclined in a forward and outward direction.

20. The apparatus of claim 14 including: guide means connected to the piston means and cylinder for retaining the longitudinal alignment of the first and second jaws during relative movement of said jaws between the extended and contracted positions thereof, said guide means having relatively moveable telescope means that prevent a relative rotation of the first and second jaws.

21. The apparatus of claim 20 wherein: the relatively moveable telescoping means comprises an elongated tubular member having a guide passage secured to the cylinder, said guide passage extending generally parallel to the longitudinal direction of the cylinder, and rod means secured to the first jaw extended into the passage of the tubular member whereby the tubular member and rod means prevent rotational movement of the first jaw relative to the second jaw to keep the jaws longitudinally aligned during relative movement thereof.

* * * * *